United States Patent [19]
Lee

[11] Patent Number: 5,995,713
[45] Date of Patent: Nov. 30, 1999

[54] METHOD OF PRINTING PATTERNS FOR VERTICALLY ALIGNING A PRINT CARTRIDGE IN AN IMAGE PRINTING APPARATUS

[75] Inventor: Myoung Sool Lee, Kyonggi-do, Rep. of Korea

[73] Assignee: SamSung Electronics Co., Ltd., Suwon, Rep. of Korea

[21] Appl. No.: 08/951,972

[22] Filed: Oct. 16, 1997

[30] Foreign Application Priority Data

Oct. 16, 1996 [KR] Rep. of Korea ............... 96-46282

[51] Int. Cl.$^6$ ............................................. G06K 15/00
[52] U.S. Cl. ...................................... 395/105; 395/117
[58] Field of Search .......................... 395/101, 105, 395/104, 110, 111–112, 108, 114, 115, 116, 117; 156/361, 384; 347/9, 12, 14, 19, 37–39; 400/1–3, 9–14, 16–17, 61–62, 67, 70, 72, 76, 88, 279, 323; 346/79, 112, 134, 139 R

[56] References Cited

U.S. PATENT DOCUMENTS

| | | |
|---|---|---|
| 4,623,418 | 11/1986 | Gombrich et al. ............... 156/361 |
| 5,101,473 | 3/1992 | Kotaki . |
| 5,150,456 | 9/1992 | Wu et al. ............................. 395/114 |
| 5,250,956 | 10/1993 | Haselby et al. . |
| 5,297,017 | 3/1994 | Haselby et al. . |
| 5,350,929 | 9/1994 | Meyer et al. . |
| 5,404,020 | 4/1995 | Cobbs . |
| 5,422,575 | 6/1995 | Ferrer et al. . |
| 5,448,269 | 9/1995 | Beauchamp et al. . |
| 5,451,990 | 9/1995 | Sorenson et al. . |
| 5,480,240 | 1/1996 | Bolash et al. . |
| 5,537,050 | 7/1996 | Haruta et al. . |
| 5,600,350 | 2/1997 | Cobbs et al. . |

Primary Examiner—Arthur G. Evans
Attorney, Agent, or Firm—Robert E. Bushnell, Esq.

[57] ABSTRACT

A method of printing patterns for vertically aligning a serial printer that increases the speed of the vertical alignment operation. The method also reduces alignment errors caused by mechanical variation by printing a plurality of aligning patterns on the same line while a carriage body is continuously moved across the printing scan axis, reduces errors caused by the motor due to the accelerating of the carrier body, and also lessens the amount of paper wasted in the vertical alignment process.

19 Claims, 5 Drawing Sheets

| Step | Continuous Carriage Direction | Printings |
|---|---|---|
| S1 | → | 1-1st Alignment Attempt |
| S2 | ← | Reference pattern |
| S3 | → | Pattern 1 |
| S4 | ← | |
| S5 | → | 2-2nd Alignment Attempt |
| S6 | ← | Reference pattern |
| S7 | → | Pattern 2 |
| S8 | ← | |
| S9 | → | 3-3rd Alignment Attempt |
| S10 | ← | Reference pattern |
| S11 | → | Pattern 3 |
| S12 | ← | |

Fig. 4

| Step | Continuous Carriage Direction | Printings | | | | |
|---|---|---|---|---|---|---|
| S1' | → | Label for 1st Alignment Attempt | * | Label for 2nd Alignment Attempt | * | Label for 3rd Alignment Attempt |
| S2' | ← | Reference Pattern(1,1) | * | Reference Pattern(1,2) | * | Reference Pattern(1,3) |
| S3' | → | Pattern(2,1) | * | Pattern(2,2) | * | Pattern(2,3) |
| S4' | ← | Pattern(3,1) | * | Pattern(3,2) | * | Pattern(3,3) |

\* The carriage stops and doubles back until there is enough distance between the carriage and the intended printing position to accelerate to the normal printing speed.

Fig. 5

| Step | Continuous Carriage Direction | Printings | | |
|---|---|---|---|---|
| S1″ | → | Label for 1st Alignment Attempt | Label for 2nd Alignment Attempt | Label for 3rd Alignment Attempt |
| S2″ | ← | Reference Pattern(1,1) | Reference Pattern(1,2) | Reference Pattern(1,3) |
| S3″ | → | Pattern(2,1) | Pattern(2,2) | Pattern(2,3) |
| S4″ | ← | Pattern(3,1) | Pattern(3,2) | Pattern(3,3) |

Fig. 6

METHOD OF PRINTING PATTERNS FOR VERTICALLY ALIGNING A PRINT CARTRIDGE IN AN IMAGE PRINTING APPARATUS

CLAIM OF PRIORITY

This application makes reference to, incorporates the same herein, and claims all rights accruing thereto under 35 U.S.C. §119 through my patent application entitled Method of Printing Patterns for Vertical Alignment earlier filed in the Korean Industrial Property Office on Oct. 16, 1996 and there duly assigned Ser. No. 1996/46282.

BACKGROUND OF THE INVENTION

1. Field of the Invention

The present invention relates to method for aligning a printer and, more particularly, to a method of printing patterns for rapidly vertically aligning a bidirectional printer.

2. Background Art

A typical printer such as a dot matrix printer, an ink-jet printer or a plotter includes a printer head mounted on a carriage for printing a plurality of rows of dots in a single scan of the print carriage across a printable medium. The typical printer prints information serially one letter per unit of time and can be unidirectional or bidirectional. A bidirectional printer can print information on a printable medium in both directions, that is, from left to right in a first line, and then form right to left in a second line. As a result, the printing speed of a bidirectional printer is twice as fast as a unidirectional printer, which can only print information in one direction and that has a carriage that must be returned to a starting position for each new line of printed characters.

The printer head is typically mounted in a print cartridge within an assembly that is mounted on the carriage of the printer. Generally, full color or black and white printing or plotting requires that the carriage supporting the printhead be precisely aligned so as to begin printing information at a precise location on a printable medium. Proper alignment of the printer is necessary to counter irregularities due to forces resulting from the acceleration and deceleration of the carrier body caused by the motor. Otherwise, any misalignment of the carriage will result in a misregistration of print images, due to incorrectly placed ink, particularly when the printer is a multi-color type of printer. Unfortunately however, mechanical misalignment of the carriage in the printable scan axis (i.e., the x-axis) and in the carriage scan axis (i.e., the y-axis) is common in contemporary printers.

Typical techniques for alignment of printers are disclosed, by way of example, in U.S. Pat. No. 5,600,350 to Cobbs entitled Multiple Inkjet Print Cartridge Alignment By Scanning A Reference Pattern and Sampling Same With Reference to a Position Encoder, U.S. Pat. No. 5,448,269 to Beauchamp entitled Multiple Inkjet Print Cartridge Alignment for Bidirectional Printing By Scanning a Reference Pattern, U.S. Pat. No. 5,451,990 to Sorenson entitled Reference Pattern for Use in Aligning Multiple Inkjet Cartridge, U.S. Pat. No. 5,404,020 to Cobbs entitled Phase Plate Design for Aligning Multiple Inkjet Cartridges by Scanning a Reference Pattern, U.S. Pat. No. 5,350,929 to Meyer entitled Alignment System for Multiple Color Pen Cartridges, U.S. Pat. No. 5,297,017 to Haselby entitled Print Cartridge Alignment in Paper Axis, U.S. Pat. No. 5,250,956 to Haselby entitled Print Cartridge Bidirectional Alignment in Cartridge Axis, in which software is incorporated into the printer to allow a user to perform vertical and horizontal alignment of a printhead using a predetermined test pattern.

I have observed that many vertical alignment processes use a series of vertical line segments to calibrate a print cartridge. During calibration of a print cartridge the cartridge must delay its printing by an appropriate amount of time, thus allowing the print cartridge to adjust its X-axis location before printing. Many processes used for aligning a print cartridge waste excessive amounts of paper. I expect that using a printing pattern for vertically aligning a bidirectional printer that allows the quantity of wasted paper to be reduced and the speed of the alignment process to be increased will increase the efficiency of the alignment process.

SUMMARY OF THE INVENTION

It is an object of the present invention to provide an improved process and apparatus for forming images on printable media.

It is another object to provide a method for printing patterns that allows for the quicker vertical alignment of print cartridges in a printer.

It is still another object to provide a method and apparatus for vertically aligning a printer that will lessen the paper waste generated.

To achieve these and other objects, the present invention contemplates printing vertical alignment patterns for a printer uses multiple columns of characters instead of just one column to speed up the alignment process and reduce the paper wasted during the alignment process. The printer prints numbers labeling columns that will each be using a different adjustment value. The adjustment value is a horizontal distance that print must be shifted from its calculated position on a page to compensate for irregularities introduced by the motor when the cartridge head is accelerated and other mechanical irregularities caused by the printing operations. By using the appropriate adjustment value the printer will be able to precisely align its printed matter while taking into account irregularities caused by printer mechanisms. Underneath each label a string of marks, numbers, letters or symbols (hereinafter collectively referred to as patterns) will be printed as the printer cartridge scans back and forth. With each new line of patterns that is printed it will be clearer which adjustment value results in more accurate printing. When the cartridge is printing a set of patterns for columns having different adjustment factors, the controller will recalculate the position used for each pattern to take into account the earlier adjustment for any prior patterns in the same horizontal line. Since all of the patterns printed along one horizontal line of the printable medium are treated by the controller as one larger character string, they can all be printed during one continuous motion of the print cartridge held by the carrier body. Thus, the printing speed may be improved and the erroneous factors, caused by the forces resulting from the motor accelerating and decelerating the print carriage, are reduced. Moreover, the use of multiple patterns for aligning one print cartridge reduces the amount of waste paper generated during the vertical alignment process.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a conceptual view showing the direction of movement of the print carriage and the order of steps for printing patterns using a first method;

FIG. 5 is a conceptive view showing the order for generating a printing pattern using a second method; and FIG. 6 is a conceptive view showing the direction of movement of the print carriage and the order for printing patterns according to the principles of the present invention.

DETAILED DESCRIPTION OF THE PREFERRED EMBODIMENTS

Figure 1:
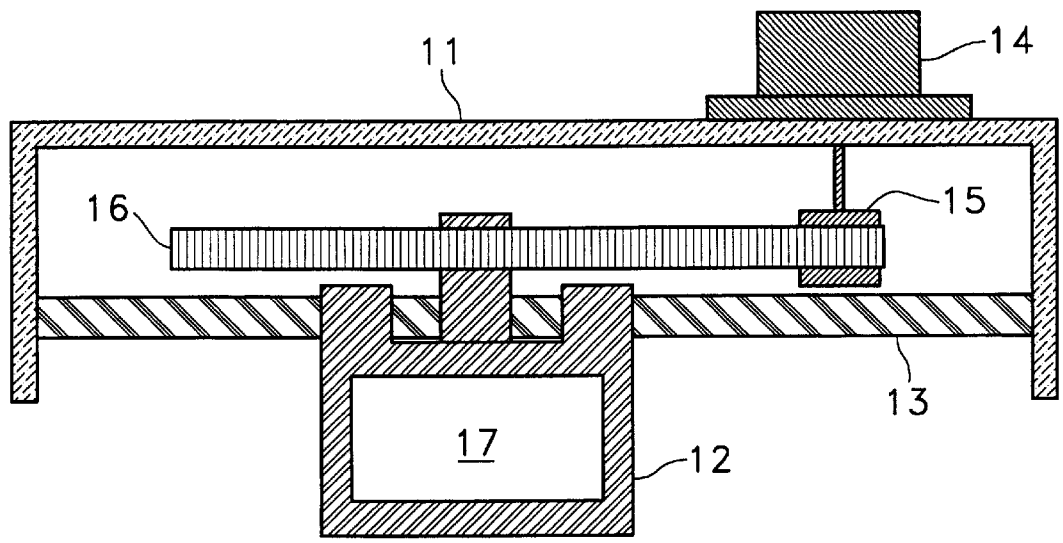
FIG. 1 is a cross-sectional view showing the salient features of a typical serial printer.

Turning now to the drawings, FIG. 1 illustrates a sectional view of a typical serial printer. The typical serial printer may be constructed with a main frame 11, enveloping a carrier system; a carriage body 12 that contains and transports the printer head; a carrier shaft 13 along which the carriage body moves 12; a carrier motor 14 that provides the power for moving the carriage body 12; a drive pulley 15 that transmits the power generated by the carrier motor 14; a timing belt 16 that transfers the power from the drive pulley to the carriage body; and a printer head port 17, contained by the carriage body 12, that engages a printer head.

Figure 2:
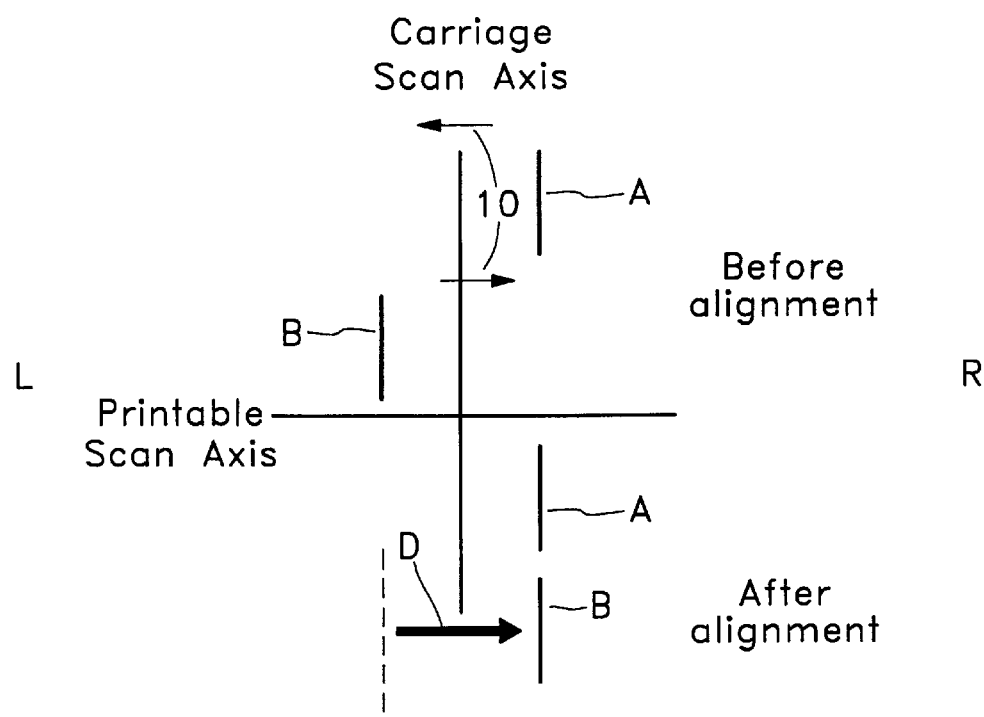
FIG. 2 is a conceptual view showing an actual printing position caused by a mechanical error, a printing position sensed by the software, and also the printing positions after performing a vertical alignment of the print cartridge in the printer.

FIG. 2 shows the error in printing position that can be caused by mechanical errors, and illustrates the actual printing position B' and the printing position A' intended by the software controlling the positioning of the print head. Also shown is accurately placed printing position B' that was made after a vertical alignment was performed on the printer. C indicates the printing position detected by the central processing unit while the carrier body 12, and thus the print cartridge, is moving across the printable scan axis. This is different from the position where the printer actually printed, position A. This error is due to mechanical irregularities caused by the force needed to accelerate the carriage body. In the next row, when the carrier body 12 is moved across the printable scan axis, position C indicates the printing position sensed by the central processing unit that is being driven by the printing software. Position B indicates the position that is actually printed and length D indicates the distance between the actual printing positions A and B. In a correctly vertically aligned printer, when the carrier body 12 is moved from left to right (in the direction toward R), B' indicates the printing position when the head fire time is delayed in order for the print head to move an extra adjustment distance equal to length D.

The typical method used for vertically aligning a printer is to have the printer make a pattern that can be evaluated to accurately calibrate the head fire times in order to attempt to vertically align the printer. After the printer is correctly aligned the proper adjustment value is stored in non-volatile memory so that the printer will correctly print in the future. The correct print position is achieved by having the computer retrieve the appropriate adjustment values and re-compute the print position so that all of the printed matter is correctly aligned vertically, regardless of which direction the bidirectional print carriage is moving along the printable scan axis.

In one typical method for printing the patterns necessary to determine the adjustments that need to be made to the head firing time, and thus to the horizontal character positioning, adj1, adj2 and adj3 indicate values for correcting the discrepancy distance D, shown in FIG. 2. FIG. 4 shows the pattern used by a typical vertical alignment method. To start, the carrier body is moved in a first direction and a label is printed in step S1 to identify the alignment attempt. Then, the carrier body is moved in an opposite direction and a reference pattern is printed in step S2. The printing positions of the characters in the pattern are P1, P2, P3, . . . , Pn. Subsequently, the carrier body is moved in the first direction and an adjusted pattern is printed. The positions of the characters in the adjusted pattern are P1+adj1, P2+adj1, P3+adj1, . . . , Pn+adj1. Then in step S4, the carrier body is moved back in an opposite direction to its initial position. This allows for a new adjustment pattern to be tried.

To test a new adjustment value the carrier body is again moved during step S5 in the first direction to print a label for the second alignment attempt (step 5). Afterwards, in step S6 the carrier body is moved in an opposite direction while printing a second reference pattern. The printing positions of the letters in the second reference pattern are P1, P2, P3 . . . , Pn. After that, in step S7 the carrier body 12 is moved in the first direction and pattern 2 is printed. The printing positions of the characters in the second pattern are P1+adj2, P2+adj2, P3+adj2, . . . , Pn+adj2. Subsequently, in step S8 the printer cartridge 12 is moved in an opposite direction and brought back to its initial position.

To test a last adjustment value a third alignment pattern is printed. First, in step S9 the printer cartridge is moved in a first direction and a label for the third alignment attempt is printed. Then, in step S10 the carrier body is moved in an opposite direction and a reference pattern is printed. The printing positions of the characters in the reference pattern are P1, P2, P3, . . . , Pn. Subsequently, in the step S11 the printer cartridge is moved in the first direction and pattern 3 is printed. The printing positions of the characters in the third pattern are P1+adj3, P2+adj3, P3+adj3, . . . , Pn+adj3. After printing the third pattern, in the step S12 the carrier body 12 is moved in the opposite direction to return it to its initial position.

A second typical method of printing patterns to vertically align a printer is shown in FIG. 5. First, in step S1' the carrier body 12 is moved in a first direction and labels for the first, second and third alignment attempts are printed. After the labels are printed, the carrier body 12 is moved during step S2' in the opposite direction, and reference patterns (1,1), (1,2), and (1,3) are printed. Then, in step S3' the carrier body is moved in the first direction and pattern (2,1) is printed. The printing position of pattern (2,1) is P(2,1)+adj1. Then, the carrier body 12 is moved in the opposite direction to obtain enough distance to accelerate and print pattern (2,2). Without enough distance to accelerate to the proper speed before printing a pattern it is impossible to correctly vertically align a printer using this method because of the forces generated by the motor during the acceleration of the carrier body. Subsequently, the carrier body 12 is moved in the first direction and prints pattern (2,2). The printing position of pattern (2,2) is P(2,2)+adj2. After printing the pattern (2,2), the carrier body 12 is moved in the opposite direction to obtain enough distance to accelerate and print the next pattern. Then, the carrier body 12 is moved in a first direction and pattern (2,3) is printed at position P(2,3)+adj3. Then, is step S4' another line of patterns is printed using the above described method. This typical pattern printing method has the drawbacks of wasting paper and using significant printing time. This is because the second typical method requires extra time to move the carrier body to the right and to the left in order to obtain enough distance to accelerate and to print the necessary patterns.

Figure 3:
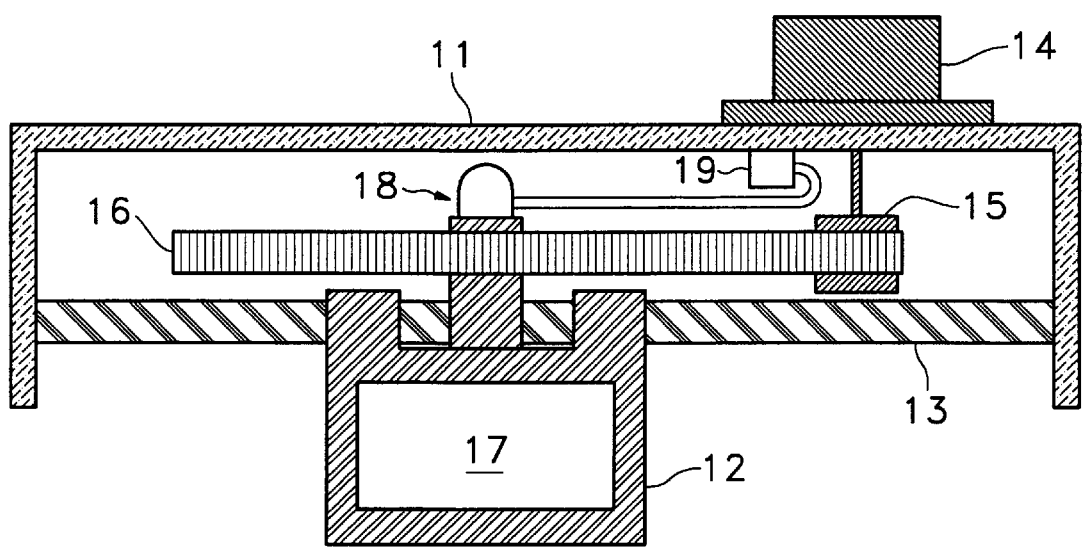
FIG. 3 is a cross-sectional view showing a serial printer with a optical sensor mounted on the body of the carriage.

The preferred embodiment for printing patterns to vertically align a printer is shown in FIG. 6. In step S1" the carrier body 12 is moved in a first direction and labels for a plurality of alignment attempts are printed. Afterwards, in step S2" the carrier body 12 is moved in an opposite direction and reference patterns (1,1), (1,2), and (1,3) are printed In steps S3" the carrier body 12 is again moved in the first direction, and the patterns (2,1), (2,2), and (2,3) are printed. Then in step S4" another line of patterns is printed in one continuous scan of the carrier body. Each character of each pattern has a printing position is increased or decreased by an adjustment value according to its alignment attempt column. That is, the printing position of the characters in pattern (2,1) are shifted as much as adj1 from the location that the controller would otherwise determine to be correct. Thus, the controller is compensating for irregularities caused by forces generated by the motor while accelerating and decelerating the carriage body. Similarly, the printing positions of the characters in patterns (2,2) and (2,3) are shifted by as much as adj2 from P(2,2) . . . , P(n,2) and shifted by as much as adj3 from P(2,3) . . . , P(n,3). Moreover, because the controller organizes patterns (2,1), (2,2), and (2,3) and their corresponding adjustments as if they were one larger string of characters, they can be printed by one continuous pass of the carriage body. As such, it is not necessary to move the carrier body 12 in an opposite direction, from that used to rint prior patterns along the same horizontal line, to gain enough distance for acceleration to the proper speed for printing further patterns. Accordingly, only an initial accelerating area is needed to print the pattern (2,1) and all the remaining patterns located on the same printing scan axis. The preferred embodiment does not require any additional apparatus for a typical printer. After printing the patterns using the method described above, a user selects the column, identified by its alignment attempt label, that has its vertical lines arranged most accurately. The selection of the best alignment column can also be done automatically by the controller. Various methods can be used to input the printed data into the controller, such as using an optical sensor 18, shown in FIG. 3, attached to the back of the carrier body to send signals back to the controller or by using a scanner to read the data into computer readable data. Once the data is entered into the controller, the data is evaluated and the adjustment value that most correctly vertically aligns the printer selected and stored in non-volatile memory.

When the length of each pattern is the same as the length of the circumference of the drive pulley 15, errors caused by the mechanical variation can be further reduced. This is because the position of the carrier body 12 and the orientation of the drive pulley 15 are the same when printing the $n^{th}$ letter of each pattern in an alignment attempt column. As described above, the printing method for vertically aligning a printer has the advantages of increasing the processing speed by printing multiple patterns in one continuous motion of the carriage body, This further reduces the erroneous forces generated by the motor and also reduces the amount of paper used in the alignment process.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A method of printing patterns for vertically aligning a bidirectional printer, comprising the steps of:

means for transporting a single printing cartridge for printing a plurality of alignment attempt labels in a first direction horizontally across a printable medium, said single printing cartridge controlled by a plurality of circuitry, each alignment attempt label corresponding to a different adjustment value;

printing a plurality of reference strings during another single continuous pass of said single printing cartridge moving in a second direction opposite to said first direction, each alignment attempt label having one reference string composed of a first plurality of characters, said reference strings combining with said alignment attempt labels to form a plurality of columns;

printing at least one line under said columns, each line comprising a plurality of aligning strings composed of a second plurality of characters printed during another single continuous pass of said single printer cartridge, each aligning string being adjusted horizontally by said adjustment value corresponding to a column containing said character string;

means for selecting a most correctly aligned column; and means for storing a best adjustment value corresponding to said most correctly aligned column.

2. The method of printing patterns for vertically aligning a bidirectional printer of claim 1, further comprised of said adjustment values being a correctional distance said aligning strings must be shifted to counter mechanically induced errors, said adjustment values corresponding to a time delay necessary for said single printing cartridge to print in an aligned position.

3. The method of printing patterns for vertically aligning a bidirectional printer of claim 1, further comprised of said means for transporting, comprising:

a motor attached to said printer and providing torque to a driving pulley;

said driving pulley having a belt attaching said driving pulley to a carriage body, said carriage body slidably mounted on a shaft and containing said printing cartridge; and said printing cartridge moving in response to said motor controlled by said circuitry.

4. The method of printing patterns for vertically aligning a bidirectional printer of claim 1, further comprised of said character strings having a length equal to the circumference of a driving pulley.

5. The method of printing patterns for vertically aligning a bidirectional printer of claim 1, further comprised of said means for selecting a most correctly aligned column being selected by a user.

6. The method of printing patterns for vertically aligning a bidirectional printer of claim 1, further comprised of said means for selecting a most correctly aligned column being determined by said circuitry after gathering the data using any one of either an optical scanner mounted on said carriage and using a scanner to input the printed data into said circuitry.

7. The method of printing patterns for vertically aligning a bidirectional printer of claim 1, further comprised of said means for storing the corresponding adjustment values corresponding to said most correctly aligned column being said circuitry storing a best adjustment value in a non-volatile memory.

8. The method of printing patterns for vertically aligning a bidirectional printer of claim 1, further comprised of said columns being three in number.

9. A method of printing patterns for vertically aligning a bidirectional printer, comprising the steps of:

means for transporting a single printing cartridge for printing a plurality of alignment attempt labels in a first direction horizontally across a printable medium, said single printing cartridge controlled by a plurality of circuitry, each alignment attempt label corresponding to a different adjustment value;

printing a plurality of reference strings during another single continuous pass of said single printing cartridge moving in a second direction opposite to said first direction, said reference strings composed of a first plurality of characters and combining with said alignment attempt labels to form a plurality of columns;

printing at least one line under said columns, each line comprising a plurality of aligning strings composed of a second plurality of characters printed during another single continuous pass of said single printer cartridge, each aligning string being adjusted horizontally by said adjustment value corresponding to a column containing said character string;

means for selecting a most correctly aligned column comprising said circuitry determining said most correctly aligned column using data gathered by any one of either an optical scanner mounted on a carriage containing said printing cartridge and a scanner reading a plurality of printed data into said circuitry; and said circuitry storing a best adjustment value, corresponding to said most correctly aligned column, in non-volatile memory.

10. The method of printing patterns for vertically aligning a bidirectional printer of claim 9, further comprised of said adjustment values being a correctional distance said aligning strings must be shifted to counter mechanically induced errors, said adjustment values corresponding to a time delay necessary for said single printing cartridge to print in an aligned position.

11. The method of printing patterns for vertically aligning a bidirectional printer of claim 9, further comprised of said means for transporting, comprising:

a motor attached to said printer and providing torque to a driving pulley;

said driving pulley having a belt attaching said driving pulley to a carriage body, said carriage body slidably mounted on a shaft and containing said printing cartridge; and said printing cartridge moving in response to said motor controlled by said circuitry.

12. The method of printing patterns for vertically aligning a bidirectional printer of claim 9, further comprised of said character strings having a length equal to the circumference of a driving pulley.

13. The method of printing patterns for vertically aligning a bidirectional printer of claim 9, further comprised of said means for selecting a most correctly aligned column being selected by a user.

14. The method of printing patterns for vertically aligning a bidirectional printer of claim 9, further comprised of said columns being three in number.

15. A method of printing patterns for vertically aligning a bidirectional printer, comprising the steps of:

means for transporting a single printing cartridge for printing a plurality of alignment attempt labels in a first direction horizontally across a printable medium, said means for transporting comprising:
      a motor attached to said printer and providing torque to a driving pulley;
      said driving pulley having a belt attaching said driving pulley to a carriage body, said carriage body slidably mounted on a shaft and containing said printing cartridge; and
      said printing cartridge moving in response to said motor controlled by said circuitry, said single printing cartridge controlled by a plurality of circuitry, each alignment attempt label corresponding to a different adjustment value;

printing a plurality of reference strings during another single continuous pass of said single printing cartridge moving in a second direction opposite to said first direction, said reference strings composed of a first plurality of characters and combining with said alignment attempt labels to form a plurality of columns;

printing at least one line under said columns, each line comprising a plurality of aligning strings composed of a second plurality of characters printed during another single continuous pass of said single printer cartridge, each aligning string being adjusted horizontally by said adjustment value corresponding to a column containing said character string;

means for selecting a most correctly aligned column comprising said circuitry determining said most correctly aligned column using data gathered by any one of either an optical scanner mounted on a carriage containing said printing cartridge and a scanner reading a plurality of printed data into said circuitry; and said circuitry storing a best adjustment value, corresponding to said most correctly aligned column, in non-volatile memory.

16. The method of printing patterns for vertically aligning a bidirectional printer of claim 15, further comprised of said adjustment values being a correctional distance said aligning strings must be shifted to counter mechanically induced errors, said adjustment values corresponding to a time delay necessary for said single printing cartridge to print in an aligned position.

17. The method of printing patterns for vertically aligning a bidirectional printer of claim 15, further comprised of said character strings having a length equal to the circumference of a driving pulley.

18. The method of printing patterns for vertically aligning a bidirectional printer of claim 15, further comprised of said means for selecting a most correctly aligned column being selected by a user.

19. The method of printing patterns for vertically aligning a bidirectional printer of claim 15, further comprised of said columns being three in number.

* * * * *